April 28, 1925.
L. F. BURKE
BICYCLE GEARING
Filed April 12, 1924
1,535,714
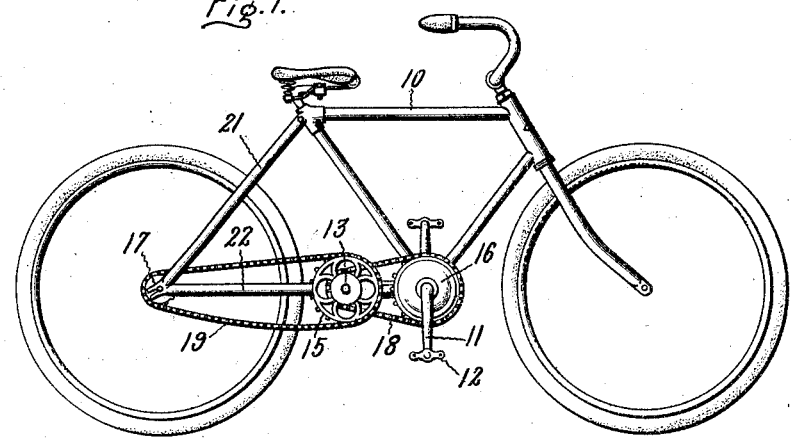
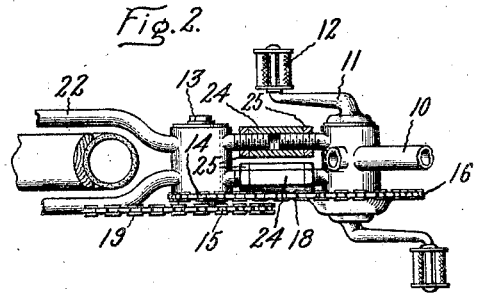
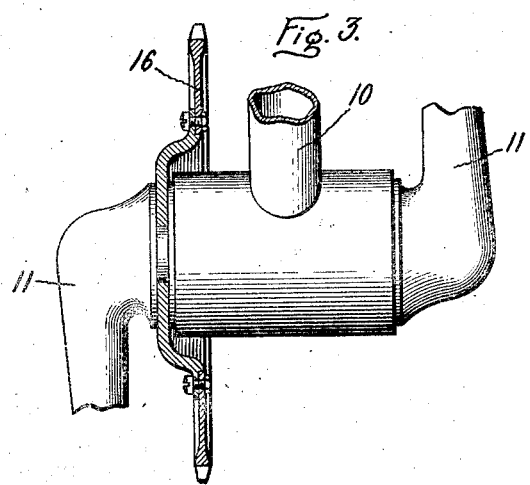
Inventor:
Lot F. Burke,
by
His Attorney.

Patented Apr. 28, 1925.

1,535,714

UNITED STATES PATENT OFFICE.

LOT F. BURKE, OF SCHENECTADY, NEW YORK.

BICYCLE GEARING.

Application filed April 12, 1924. Serial No. 706,083.

*To all whom it may concern:*

Be it known that I, LOT F. BURKE, a citizen of the United States, residing at Schenectady, in the county of Schenectady, State of New York, have invented certain new and useful Improvements in Bicycle Gearing; and I do declare the following to be a full, clear, and exact description of the invention, such as will enable others skilled in the art to make and use the same.

My invention relates to improvements in gearing for bicycles, and has for one of its objects to provide a gearing connection between the pedal shaft and the rear wheel of a bicycle whereby, the gear ratio of the bicycle can be increased without increasing the size of the crank shaft sprocket and thus decreasing the crank leverage.

Other features of novelty which characterize my invention are pointed out with particularity in the claims connected to and forming a part of this specification.

It is well known that a relatively large crank shaft sprocket wheel will give a higher bicycle speed with a given pedal speed than would be the case with a smaller crank shaft sprocket and it is also well known that such an arrangement will decrease the crank leverage and consequently cause the bicycle to pedal harder for a given speed than would be the case if a smaller crank shaft sprocket were used. Such arrangements have been used to some extent but are not popular because a large sprocket wheel is annoying and greatly increases the tendency of the chain to catch and also soil the clothes of the rider, this being particularly true in the case of lady riders.

It has been suggested to use a double set of sprockets and two chains. These devices however are open to several objections, the arrangements are cumbersome, are difficult to adjust for chain tightness, and require a longer crank shaft than is customarily provided on a standard bicycle which makes it difficult to align the sprockets. These features result in inefficient operation and in the pedals being placed farther apart thus making pedalling of the bicycle very tiresome and uncomfortable.

The gearing which I have produced gives a maximum of efficiency, is an improvement to the appearance of the machine and possesses many other novel features which will be pointed out in the following description and specically claimed in the claims annexed hereto and forming a part of this specification.

For a better understanding of my invention, reference may be had to the following description taken in connection with the accompanying drawing in which Fig. 1 is a side elevation of a bicycle equipped with a drive embodying my invention. Fig. 2 is a fragmentary plan view showing the arrangement of the shaft and chain adjusting means and Fig. 3 is a fragmentary front view showing the crank shaft and driving sprocket.

In Fig. 1, a bicycle is shown having a frame 10 provided with the usual crankshaft 11 and pedals 12. A second shaft 13 is also provided in the frame 10 between the crank shaft 11 and the rear wheel. This second shaft 13 carries a small sprocket 14 and a larger sprocket 15, the larger sprocket 15 being located on the outer end of the shaft 13. The crank shaft 11 is also provided with a sprocket 16 which is turned inwardly toward the frame 10 and has its teeth located in line with the small sprocket 14 on the second shaft 13. The rear wheel of the bicycle carries a small sprocket 17 which is in line with the larger sprocket 15 on shaft 13. Power is applied to this rear wheel by chains 18 and 19, which connect the crank shaft sprocket 16, small sprocket 14 on the second shaft and the larger sprocket 15 on the second shaft 13 to the rear wheel sprocket 17 respectively. The frame 10 is preferably made with a rear portion which is relatively movable with respect to the front portion. This movement is thus provided by pivoting the diagonal member 21 of the rear portion of the frame at the joint in the frame just below the seat. This pivot is not necessary, however, because the frame will yield sufficiently to permit the necessary movement. The rear portion also has a horizontal member 22 which carries the second shaft 13. The horizontal member 22 is connected with the front portion of the frame 10, by an adjustable coupling. In the drawing, this coupling is shown as composed of two turnbuckle connections consisting of threads on the frame members and a right and left hand threaded nut 24. This arrangement permits adjustments to be made in the tightness of the chain 18. The nuts 24 are also provided with locking means in the form of smaller nuts 25 which when tightened against the nuts 24 prevent them from moving.

Heretofore in bicycles and the like where a second shaft such as shaft 13 is used, it has been customary to mount the shaft 13 eccentrically within a suitable housing and adjust the chains by rotating the shaft within this housing. This arrangement however is not as good as the present arrangement for when the shaft is rotated to tighten one chain, it will loosen the other and a second adjustment is then necessary to tighten the second chain. With my present arrangement adjustments can be made to either chain without affecting the adjustment of the other. The chain 18 can be adjusted by the nut 24 and the chain 19 is adjusted at the rear wheel shaft where it engages the frame 10 as is the usual practice.

Another feature is the arrangement of the sprockets which permits the use of a double set of sprockets on a standard bicycle frame without increasing the length of the crank shaft 11.

By providing a detachable joint for the diagonal member 21, under the seat, the rear portion of the frame can be removed and attached at will, thus making it possible to provide an attachment which can be sold separately and attached to standard bicycle frames by merely providing suitable securing means in the frame at a point below the seat and threading the extending portions of the frame adjacent the crank shaft housing.

Although I have described my invention with considerable detail and with respect to a certain particular form of my invention, I do not desire to be limited to such details since many changes and modifications may well be made without departing from the spirit and scope of my invention in its broadest aspect.

What I claim as new and desire to secure by Letters Patent of the United States is:—

1. In a bicycle drive, the combination with the usual crank shaft, sprocket wheel thereon and rear wheel sprocket, of a frame having a relatively movable rear end, a second shaft journaled in said rear end between the crank shaft and rear wheel sprocket, said second shaft having two sprockets of different size on one end, the larger of the two being on the outer end of said second shaft and in line with said rear wheel sprocket, and means between the crank shaft and said second shaft for securing said relatively movable rear end in any desired position.

2. In a bicycle drive, the combination with the usual crank shaft, sprocket wheel thereon and rear wheel sprocket, of a second shaft journaled in the rear part of said frame between and in line with the crank shaft and rear wheel sprocket, and a turnbuckle connection between said second shaft and said crank shaft for varying the distance between the two.

3. In a bicycle drive, the combination with the usual crank shaft, a sprocket wheel thereon and rear wheel sprocket, of a second shaft journaled in the frame between the crank shaft and the rear wheel sprocket, a pair of sprockets on said second shaft, a chain for transmitting power from said crank shaft sprocket wheel to one of said sprockets on said second shaft, and means between said crank shaft and said second shaft and in line therewith for varying the distance there between, whereby the tightness of said chain may be adjusted.

4. In a bicycle drive, the combination with the usual crank shaft, sprocket wheel thereon and rear wheel sprocket, of a second shaft journaled in the frame between said crank shaft and rear wheel sprocket, means for varying the distance between said crank shaft and rear wheel sprocket for adjusting the chain connection between said crank shaft and said second shaft without affecting the adjustment of the chain between said second shaft and said rear wheel sprocket.

5. In a bicycle, the combination of a frame having relatively movable front and rear portions, a crank shaft having the usual driving sprocket carried by said front portion, a wheel and the usual driven sprocket carried by said rear portion, and adjustable means for securing said front and rear portions together whereby the distance between said driving sprocket and said driven sprocket may be varied.

6. In a bicycle drive, the combination with the usual crank shaft and rear wheel sprocket, a frame having a detachable rear end, a second shaft journaled in said rear end and between the crank shaft and rear wheel sprocket, and means between said crank shaft and said second shaft for securing said rear end to said frame.

7. In a bicycle, the combination with a frame having a relatively movable rear portion, said rear portion carrying the usual rear wheel and rear wheel sprocket, a second shaft carrying two sprockets one of which is adapted to be connected to said rear wheel sprocket also carried by said rear portion, a crank shaft journaled in the main portion of said frame having a sprocket adapted to be connected to the other of said sprockets on said second shaft, and adjustable means between said second shaft and said crank shaft for securing said rear portion to the main portion of said frame and adjusting the distance between said last mentioned sprockets.

In witness whereof, I have hereunto set my hand this 8th day of April, 1924.

LOT F. BURKE.